June 20, 1967     WILLIAM I. L. WU     3,327,210
SCANNING SPECTRUM ANALYZER
Filed March 13, 1963
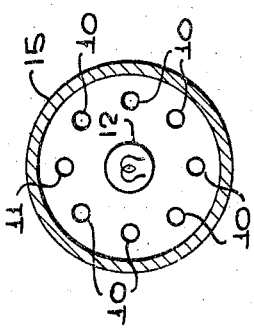
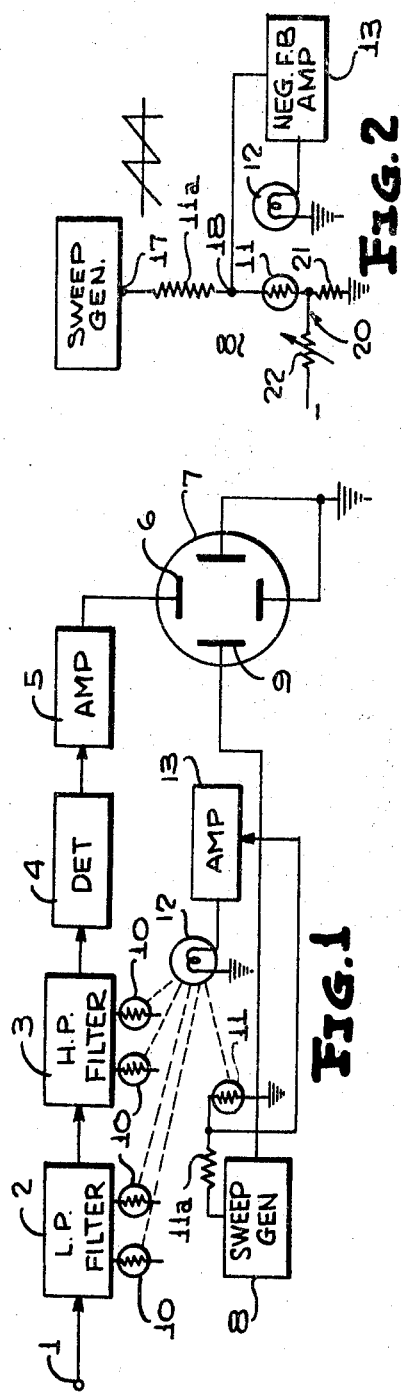
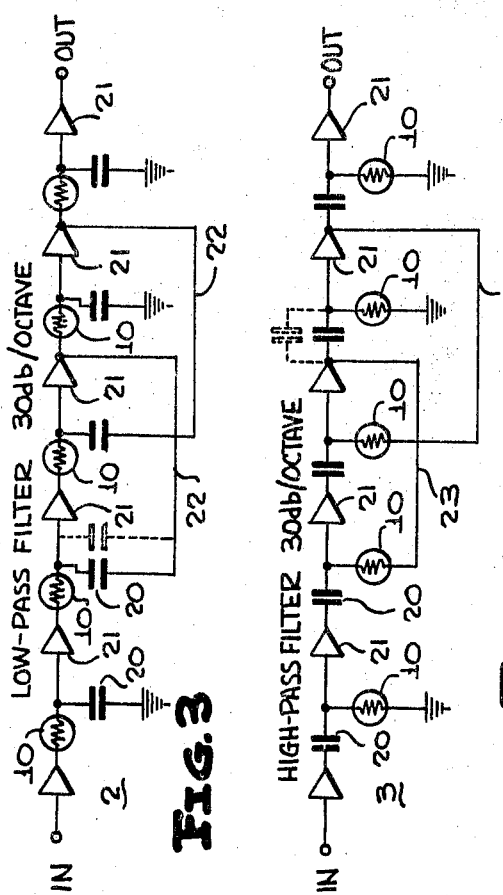
INVENTOR
WILLIAM I. L. WU
BY *Hurvitz & Rose*
ATTORNEYS

3,327,210
SCANNING SPECTRUM ANALYZER

William I. L. Wu, New Rochelle, N.Y., assignor to The Singer Company, New York, N.Y., a corporation of New Jersey
Filed Mar. 13, 1963, Ser. No. 264,875
8 Claims. (Cl. 324—77)

The present invention relates generally to scanning spectrum analyzers, and more particularly to scanning filter spectrum analyzers, employing resistance tuned filters.

It is known to provide a visual display of the frequency spectrum of a band of frequencies, employing a frequency scanning superheterodyne receiver as the frequency responsive element. By extension, tuned filter frequency responsive elements may be utilized. The problem of employing tuned filter scanning spectrum analyzers becomes difficult when the frequency band under examination is extremely wide band, on a percentage basis; for example, in low frequency spectrum analyzers, such as sub-audio or audio spectrum analyzers. The band under examination may then extend from 30 c.p.s. to 20 kc., for example, and simple band pass filters capable of tuning over such ranges are not available.

While resistance tunable high pass and low pass filters having sharp cut off are available, continuous variation of cut-off frequencies over wide ranges is difficult because this involves variation of resistance over wide ranges. Usually, resistance switching must be resorted to, which is not practical in spectrum analysis, or at least is highly undesirable.

According to the present invention, a resistance tuned high pass filter is combined with a resistance tuned low pass filter, to provide a band-pass characteristic. Ganged variation of the several resistances which control tuning then provides a variably tuned band pass filter. However, filters of adequately sharp cut-off require several cascaded sections, whether high pass or low pass. The band pass system therefore requires a considerable number of variable resistances, at least one for each section, all of which must track accurately when varied. Were conventional resistances employed attainment of the requisite tracking, if not impossible, would be very expensive.

According to a primary feature of the present invention, resistance tunable filters are employed which require multiple resistors, variable together in tracking relation, said resistors being photo-conductors all subjected to the same variable intensity source of light. It is then found that suitable photo-conductors which have the requisite tracking accuracy are commercially available.

A spectrum analyzer may employ an oscilloscopic display, as one form of visual display. Such a display requires generation of a frequency base line, synchronized with the tuning of the scanning filter of the system. According to the present invention, a sawtooth voltage which can serve as a frequency base line generator may be provided in terms of a photo-conductive potentiometer, subjected to the same variable light source as is the filter itself. Thereby, the base line and the filter are inherently ganged or locked.

One difficulty of designing such a system is that non-linearity of potentiometer output may exist due to non-linearity of the excitation-response characteristic of the photo-conductor. To avoid this difficulty the light source, or excitation source is energized from the same variable voltage as is the photo-conductive potentiometer, but from a point thereof whereon exists a voltage proportional to the voltage drop across the photo-conductor. The amplifier is so arranged as to provide negative feedback for the system thereby to linearize system response. Negative feedback is provided by applying to the lamp a voltage co-phasal with the voltage across the photo-conductor, since conductivity of the photo-conductor is proportional to excitation.

It is, accordingly, an object of the present invention to provide a sharp cut-off multi-section resistance tuned filter, employing photo-resistors as tunable elements.

It is another object of the invention to provide a novel tunable band-pass filter, tunable by varying the intensity of a source of light.

It is a more specific object of the invention to provide a novel spectrum analyzer of the scanning filter type, wherein scanning over many octaves is made possible by utilizing a scanning filter employing multiple ganged photo-resistors as tuning elements.

A further object of the invention resides in the provision of a novel sweep circuit generator for an oscilloscope employed as a visual indicator of a spectrum analyzer, wherein the sweep is locked with respect to the instantaneous response frequency of the analyzer.

Still another object of the invention is to provide a photo-conductive potentiometer employing negative feedback photo-conductor excitation.

The above and still further objects, features and advantages of the present invention will become apparent upon consideration of the following detailed description of one specific embodiment thereof, especially when taken in conjunction with the accompanying drawings, wherein:

FIGURE 1 is a block diagram of a spectrum analyzer according to the invention;

FIGURE 2 is a schematic circuit diagram of a sweep voltage generator, according to the invention;

FIGURE 3 is a low pass filter employed in the system of FIGURE 1;

FIGURE 4 is a high pass filter employed in the system of FIGURE 1; and

FIGURE 5 is a view in section through a container for the light sensitive element.

Referring now more particularly to the accompanying drawings, the reference numeral 1 denotes an input terminal for a wide band spectrum analyzer, operative preferably over the audio band, say from 30 c.p.s. to 20 kc. Connected in cascade with terminal 1 are low pass and high pass filters 2 and 3, respectively, followed by a detector 4 and amplifier 5. The amplifier 5 is suitably designed to drive the vertical deflection electrode 6 of a CRT 7.

A sweep generator 8 is connected to the horizontal deflection electrode 9 of CRT 7. Each of filters 2, 3 contains a number of photo-conductors 10, the number being a matter of design, and particularly, one photo-conductor is available for each cascaded filter section of filters 2, 3. The sweep generator 8 may drive a photo-potentiometer having a photo-conductor 11 in series with a fixed resistance 11a. All the photo-resistors 10 and 11 are subjected to light from a common lamp 12, supplied with heating current from sweep generator 8 via amplifier 13, which has input proportional to voltage across photo-conductor 11.

The filter 2 may have a cut-off frequency which is displaced from the cut-off frequency of filter 3. The difference between the cut-offs equals the band pass of the combined filters, and hence the resolution capability of the spectrum analyzer. Since both filters 2 and 3 are resistance tunable, by varying the resistances of photo-conductors 10, and since all the photo-conductors 10 are subjected to illumination from a common source, the filters track, i.e., maintain their combined pass band, as the cut-off frequencies vary. Tracking is best accomplished by placing all the photo-conductors 10, 11 in a light impervious case 15, on a common circumference, and placing the lamp 12 at its center, FIGURE 5. Thereby, all the photoconductors receive light of the same intensity at all times, and no extraneous light is imposed on any photo-conductor. If any photo-conductor is found to be unmatched with the others, it can be shielded with a dab of black paint or ink. Once all the photo-conductors match for any one light intensity, they match for all light intensities to an amazing extent, and perfectly well for the application in hand.

The sweep generator 8 may drive a photo-conductor 11, and a fixed resistance 11a, connected in series with photo-conductor 8, between a sawtooth voltage terminal 17 and ground. Sweep voltage may be taken from junction 18. As light source 12 varies in response to sawtooth current delivered by the generator, the resistance of photo-conductor 11 is caused to vary between a negligible value (a few ohms) and several megohms. Thereby, the sweep voltage at terminal 18 essentially follows the current to light source 12 and is of sawtooth wave form.

The lamp 12 may be driven from terminal 18 via an amplifier 13, which introduces negative feedback into the system and linearizes same. The D.C. level at point 18 may be varied by potentiometer 20 having a fixed arm 21 connected between photo-conductor 11 and ground, and a variable arm 22 connected between a negative D.C. source and the photo-conductor 11. The operating point of the system may thus be adjusted as desired.

The low pass and high pass filters 2 and 3 are comprised of multiple cascaded sections, of RC type, i.e., series resistances 10 and shunt capacitors 20, in the case of the low pass filters (FIGURE 3), and series capacitors 20 and shunt resistances 10 in the case of the high pass filters (FIGURE 4).

The separate sections are coupled by means of isolating amplifiers 21. These may be designed to have high input impedance and low output impedance. Feed-back loops are provided internally of each filter, as at 22, 23, where capacitors 20 of the low pass filter, and resistances 10 of the high pass filter, respectively, are included in the loops.

Filters of the general type illustrated have been described, as to design features and formulas, in U.S. Patent No. 2,936,426, to J. F. McClean. However, other forms of resistance tunable filters may be employed, the specific filters involving a matter of choice, as providing the required sharp cut-off characteristics.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In combination, a tunable high pass filter, a tunable low pass filter, means connecting said filters to provide a band pass characteristic, the cut-off characteristics of said filters being separated by a predetermined frequency band constituting the pass band of the combined filters, each of said filters including means for tuning, said means for tuning including a plurality of photo-conductors, and a common source of light of variable intensity illuminating all said photo-conductors simultaneously.

2. The combination according to claim 1 wherein is further provided a visual indicator having a frequency base line deflection device and an amplitude deflection device, means coupling said filters to said amplitude deflection device, and means for supplying a deflection voltage representative of the band pass of said filters to said frequency base line deflection device.

3. A tunable filter, comprising a plurality of cascaded sections, each of said sections including a resistance and a condenser, the electrical values of said resistances and condensers establishing the cut-off frequency of said filter, said resistances being photo-conductors, and a common source of light of variable intensity illuminating all said photo-conductors simultaneously.

4. A spectrum analyzer comprising a low pass filter having a cut-off frequency $F_1$, a high pass filter having a cut-off frequency $F_2$, said filters together having a band pass $F_2-F_1$, each of said filters being resistance tuned, means for varying all said resistances in ganged relation whereby to vary the mean frequency $$\frac{F_2-F_1}{2}$$

over a range of values, and means for plotting the combined response of said filters to a wide band of frequencies as a function of said mean frequency.

5. The combination according to claim 4 wherein said resistances include photo-conductors and said means for varying includes a source of light of variable intensity applied to all said photo-conductors equally and simultaneously.

6. A spectrum analyzer comprising a bandpass filter including a low pass filter, and a high pass filter in cascade with said low pass filter, each of said filters being resistance tuned, all of the tuning resistances being photo-resistors; a common source of light for illuminating said photoresistors simultaneously; an oscilloscope having first and second orthogonal beam deflecting means; means coupled to said bandpass filter for applying to said first beam deflecting means a deflection voltage representative of the output voltage of said bandpass filter upon application of a waveform to be analyzed to said low pass filter; and sweep voltage generating means for varying the intensity of light emanating from said light source in accordance with variations in the sweep frequency voltage applied to said second deflecting means.

7. The combination according to claim 6 wherein said sweep voltage generating means comprises a sweep generator, a photo-conductive potentiometer including a fixed resistance and a photoresistor connected in series with said fixed resistance, means applying the output voltage of said sweep generator to said potentiometer as the reference voltage therefor, the last-named photoresistor disposed for illumination by said common source of light simultaneously with the first-named photoresistors, an amplifier, means for driving said amplifier with a signal derived from said potentiometer, said amplifier including an output circuit coupled to said light source in degenerative energizing relation thereto.

8. The combination according to claim 7 wherein said second beam deflecting means is driven by said sweep generator.

References Cited

UNITED STATES PATENTS

| | | | |
|---|---|---|---|
| 1,994,232 | 3/1935 | Schuck | 324—77 X |
| 2,206,072 | 7/1940 | Barthelemy | 250—206 X |
| 2,499,484 | 3/1950 | Friend | 250—206 X |
| 2,577,758 | 12/1951 | Hastings | 324—77 |
| 2,606,970 | 8/1952 | Scott | 333—70 X |
| 2,936,426 | 5/1960 | McClean | 330—91 |
| 3,153,192 | 10/1964 | Pidhayny | 324—77 |
| 3,182,271 | 5/1965 | Aiken | 330—59 X |
| 3,235,793 | 2/1966 | Reese | 324—1 |

RUDOLPH V. ROLINEC, *Primary Examiner.*

WALTER L. CARLSON, *Examiner.*

A. E. RICHMOND, P. E. WILLE,
*Assistant Examiners.*